Patented Aug. 15, 1933

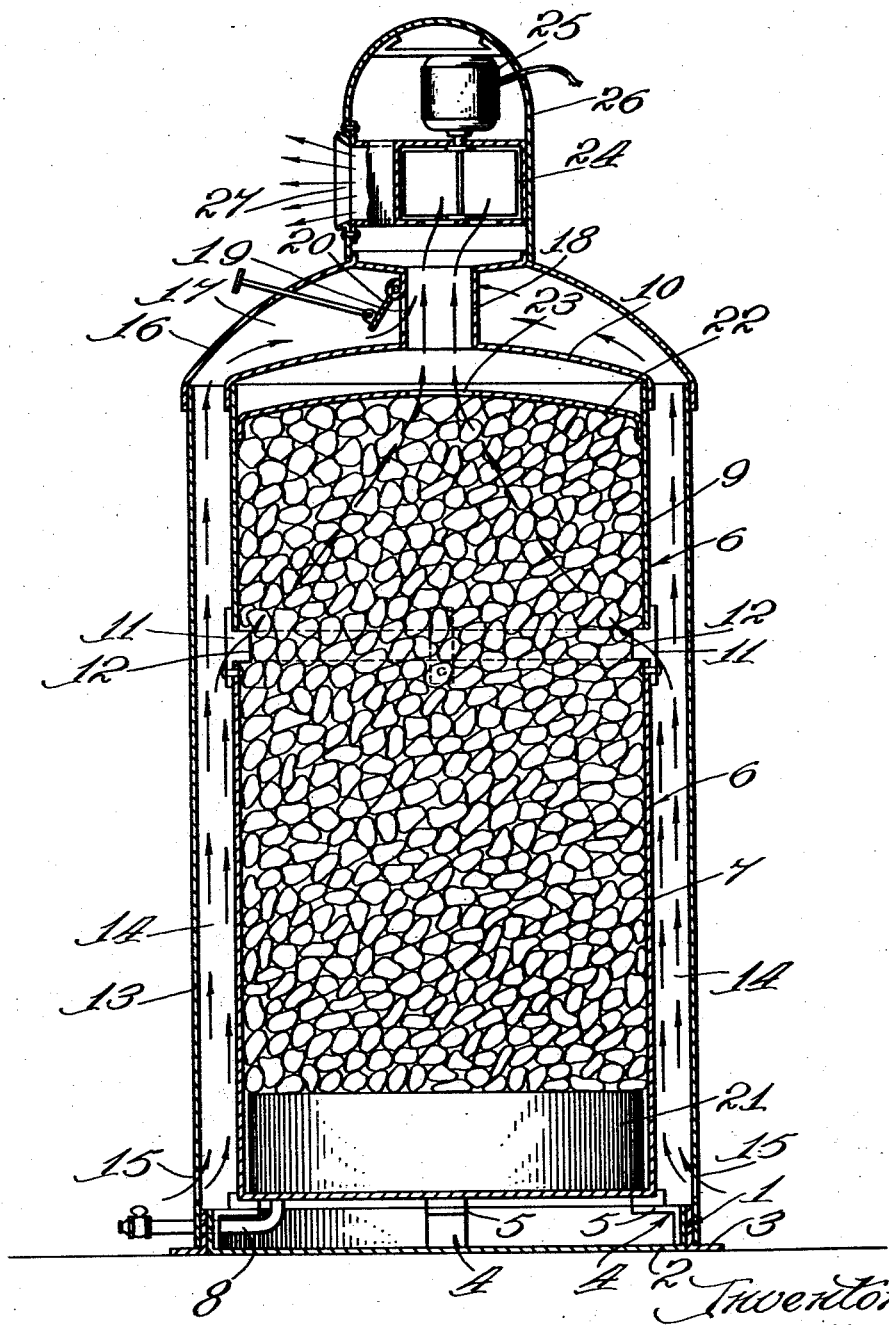

1,922,790

UNITED STATES PATENT OFFICE 1,922,790

AIR CONDITIONING APPARATUS

Fern R. Alger, Kansas City, Mo.

Application November 16, 1932
Serial No. 642,962

14 Claims. (Cl. 62—133)

My invention relates to apparatus for supplying cooled and dehumidified air, and utilizing ice as the cooling and dehumidifying medium; and my primary objects are to provide a novel, simple, relatively inexpensive and compact construction of apparatus of the general character above referred to which will operate to better advantage in performing its functions than apparatus as hitherto provided and will operate with the maximum efficiency to cool and dehumidify the air, effecting cooling of the air below the dew point, thus dehumidifying it, practically as long as any ice remains in the apparatus.

The accompanying drawing illustrates by a view in vertical sectional elevation an air-conditioning apparatus constructed in accordance with my invention.

The apparatus shown comprises a base 1 of any desirable construction shown as formed of a pan member 2, an encircling ring 3 of L-shape in cross section secured thereto and a plurality of spaced apart brackets 4 secured to the rim of the pan 2 and affording inwardly projecting ledges 5. Mounted on the ledges 5 is an ice container 6, preferably cylindrical, and apertured at its side wall for the passage of air currents into it, as and for the purpose hereinafter explained. In the particular construction shown the container 6 is formed of a lower section 7 closed at its bottom except for a valve equipped drain-pipe 8 and open at its top, and an upper section 9 open at its bottom and closed at its top by a cover portion 10, except for a central air-discharge opening hereinafter described, these sections being connected together in vertically alined, but spaced apart, position by means of clips 11 secured to the section 7 and having spacer-portions 12 which extend between the adjacent ends of the sections 7 and 9 and inwardly beyond the inner surfaces of these sections. If desired, the space between the sections 7 and 9 may be covered with any suitable mesh (not shown) to prevent pieces of the ice from falling outwardly through the opening between these sections.

The apparatus also comprises a shell, or housing, 13, preferably cylindrical, which surrounds the container 6 in spaced relation thereto to form an annular space 14 between the container and housing which is open to the atmosphere at the lower end of the housing 13 as through a series of openings 15 in the lower edge portion of the housing.

The housing 13 is formed with a cover-portion 16 spaced from the cover-portion 10 to present an annular space 17 therebetween in communication with the space 14 and through which a short pipe-section 18, opening through the center of the cover-portion 10 and the cover-portion 16, extends, the pipe section 18 being shown as having an opening 19 in its side wall in communication with the space 17 controlled by a swinging damper 20.

The lower section 7 of the container 6 contains a float 21 the upper limit of travel of which is controlled by the portions 12 of the clips 11 which extend into the upward path of movement of the float.

The upper section 9 of the container 6 contains a follower-lid 22 having a central opening 23 and adapted to rest on the top of the mass of broken ice in the container 6 and follow down with the ice as it melts, the portions 12 of the clips 11 serving to limit the descent of the lid 22.

Any suitable means for effecting the desired flow of air though the apparatus may be provided, those shown comprising a blower 24, represented as of the centrifugal type and driven by a motor 25, these devices being located in a dome 26 rising from the cover 16. The dome has an air-discharge port 27 in its side wall through which the air drawn into the blower through the tube 18 discharges into the space, such as a room, to be supplied with the conditioned air.

In the use of the apparatus the ice, broken into pieces of the desired size, preferably to present voids of a volume equal substantially to one-third of the volume of the mass formed of the pieces of ice, is charged into the container 6 and upon the float 21 to substantially fill the container as shown, and the housing 13, cover 10 and follower 22 then applied to the positions shown and the motor 25 started into operation.

Under the action of the blower 24 air is drawn, through the openings 15, into the annular space 14 and thence through the openings between the container-sections 7 and 9 and into the ice mass from which it passes upwardly through the opening 23 in the follower 22 and thence through pipe 18 into the blower discharging out of the apparatus through the outlet 27, the air thus passing through the apparatus becoming cooled and dehumidified by direct contact with the ice.

As the ice melts the water resulting therefrom collects in the bottom of the container-section 7 thus exerting a lifting action on the float 21 and consequently on the ice above the float which insures the presence of a body of ice at the openings between the sections 7 and 9 and above the water and thus in the path of the air stream practically as long as any of the ice remains unmelted, the container-section 6 preferably being of such size that the water resulting from the melting of all of the ice plus the water removed from the air in dehumidifying it, will substantially fill this section.

Inasmuch as the temperature of the air in passing through ice is reduced to or below the dew point, the apparatus continues to cool and dehumidify the air practically as long as any ice remains unmelted.

The follower 22 operates as a deflector or baffle to cause the air currents to travel through the mass of ice toward the central opening 23 as distinguished from flowing up along the sides of the container and which would result in ineffective cooling of the air particularly when the ice level in the container has appreciably lowered.

As will be noted, the continued melting of the ice will result in increased accumulation of the water in the container below the float 21 which results in the partial insulation of the water from the ice because of the interposed float which latter, if desired, may be filled with insulating material to enhance the insulating action. The water thus insulated from the ice removes heat from the air passing around the outside of the lower portion of the container 6, resulting in the temperature of this water being raised by the circulating air to substantially the same temperature as this air, and such water as may be removed from the air in passing to the point of entrance into the container 7 and gravitating in the space 14 is caught by the pan 2.

The damper-equipped opening 19 is provided for the purpose of by-passing, as desired, a portion of the air around the ice mass to the end of varying the temperature of the air discharged from the apparatus to suit varying conditions, thereby permitting of the use of an apparatus of sufficient size to meet all conditions without the necessity of intermittently operating the apparatus or varying the fan-speed.

While I have illustrated and described a particular embodiment of my invention, I do not wish to be understood as limiting it thereto as the same may be variously modified and altered and the invention embodied in other forms of apparatus without departing from the spirit of my invention.

What I claim as new and desire to secure by Letters Patent, is:

1. Air-conditioning apparatus comprising a container for ice and in which the water resulting from the melting of the ice collects, the apparatus having a passage through which the air to be conditioned flows, and a float in said container beneath the ice and exerting buoying action on the ice and movable under the buoying action of the water toward said passage for maintaining ice in position for contact by the air flowing in said passage.

2. Air-conditioning apparatus comprising a container for ice and in which the water resulting from the melting of the ice collects, the side wall of said container being apertured for the passage of the air to be conditioned into the container, and a float in said container beneath the ice and exerting buoying action on the ice and movable under the buoying action of the water toward said passage for maintaining ice at the apertured portion of said container for contact by the air flowing through said apertured portion.

3. Air-conditioning apparatus comprising a container for ice and in which the water resulting from the melting of the ice collects, a housing open to the air to be conditioned and surrounding, and spaced from, said container, the side wall of said container being apertured for the passage from the space betwen said container and housing and into said container of air entering said space, and a float in said container beneath the ice and exerting buoying action on the ice and movable under the buoying action of the water toward said passage for maintaining ice at the apertured portion of said container for contact by the air flowing through said apertured portion.

4. Air-conditioning apparatus comprising a container for ice, and a baffle supported on the ice mass in said container and adapted to descend as the ice melts, said container having an inlet for air to be conditioned and said baffle containing an outlet for the air so positioned as to compel the air to travel through the ice mass.

5. Air-conditioning apparatus comprising a container for ice, and a baffle supported on the ice mass in said container and adapted to descend as the ice melts, said container having an inlet for air to be conditioned and said baffle containing at its center an outlet for the air so positioned as to compel the air to travel through the ice mass.

6. Air-conditioning apparatus comprising a container for ice, and a baffle supported on the ice mass in said container and adapted to descend as the ice melts, said container having in its side below said baffle an inlet for air to be conditioned and said baffle containing an outlet for the air so positioned as to compel the air to travel through the ice mass.

7. Air-conditioning apparatus comprising a container for ice and in which the water resulting from the melting of the ice collects, a baffle supported on the ice mass in said container and adapted to descend as the ice melts, the apparatus having a passage opening through said baffle and through which the air to be conditioned flows, and a float in said container beneath the ice and exerting a buoying action on the ice and movable under the buoying action of the water toward the apertured portion of said container for maintaining ice in position for contact by the air flowing in said passage.

8. Air-conditioning apparatus comprising a container for ice and in which the water resulting from the melting of the ice collects, a baffle having a central opening and supported on the ice mass in said container and adapted to descend as the ice melts, the apparatus having a passage communicating with the opening in said baffle and through which the air to be conditioned flows, and a float in said container beneath the ice and exerting a buoying action on the ice and movable under the buoying action of the water toward the apertured portion of said container for maintaining ice in position for contact by the air flowing in said passage.

9. Air-conditioning apparatus comprising a container for ice and in which the water resulting from the melting of the ice collects, the side wall of said container being apertured for the passage of the air to be conditioned into the container, a baffle supported on the ice mass in said container and adapted to descend as the ice melts, said baffle containing an opening for the passage of air therethrough, and a float in said container beneath the ice and exerting buoying action on the ice and movable under the buoying action of the water toward said passage for maintaining ice at the apertured portion of said container for contact by the air flowing through said apertured portion.

10. Air-conditioning apparatus comprising a container for ice and in which the water resulting from the melting of the ice collects, a housing open to the air to be conditioned and surrounding, and spaced from, said container, the side wall of said container being apertured for the passage from the space between said container and housing and into said container of air entering said space, a baffle supported on the ice mass in said container and adapted to descend as the ice melts, said baffle having an opening for the passage of air therethrough, and a float in said container beneath the ice and exerting buoying action on the ice and movable under the buoying action of the water toward the apertured portion of said container for maintaining ice at said apertured portion for contact by the air passing through said apertured portion.

11. Air-conditioning apparatus comprising a container for ice and in which the water resulting from the melting of the ice collects, the apparatus having a passage through which the air to be conditioned enters within the confines of the container wherein it is subjected to the cooling action of the ice, and a float in said chamber beneath the ice and exerting buoying action on the ice and movable under the buoying action of the water toward said passage for maintaining ice in position for contact by the air flowing in said passage, said passage being so disposed that the float, upon the melting of substantially all of the ice, extends substantially at said passage.

12. Air-conditioning apparatus comprising a container for ice and in which the water resulting from the melting of the ice collects, a housing open adjacent its bottom to the air to be conditioned and surrounding, and spaced from, said container, the side wall of said container being apertured above the opening through which the air enters the housing for the passage from the space between said container and housing and into the container of air entering said space, and a float in said container beneath the ice and exerting buoying action on the ice and movable under the buoying action of the water toward said passage for maintaining ice at the apertured portion of said container for contact by the air flowing through said apertured portion.

13. Air-conditioning apparatus comprising a container for ice and in which the water resulting from the melting of the ice collects, a housing surrounding, and spaced from, said container and having an inlet for air to be conditioned and an air-outlet, the side wall of said container being apertured between said inlet and said air-outlet for the passage from the space between said container and housing and into said container of air in said space, means controlling said air-outlet, and a float in said container and by which the ice is supported, said housing and inlet being so disposed that air entering said inlet flows along the wall of the portion of said container in which the water, resulting from the melting of the ice, contacts.

14. Air-conditioning apparatus comprising a container for ice and in which the water resulting from the melting of the ice collects, a housing surrounding, and spaced from, said container and having an inlet for air to be conditioned and an air-outlet, the side wall of said container being apertured between said inlet and said air-outlet for the passage from the space between said container and housing and into said container of air in said space, means operating to produce flow of air into said housing and into said container through the aperture in the side wall of said container and thence out of said container and also from said housing through said air-outlet, valve means for said air-outlet, and a float in said container and by which the ice is supported, said housing and inlet being so disposed that air entering said inlet flows along the wall of the portion of said container in which the water, resulting from the melting of the ice, collects.

FERN R. ALGER.